United States Patent [19]

Emoto

[11] 4,436,415
[45] Mar. 13, 1984

[54] EXPOSURE PROCESS FOR USE IN A VARIABLE MAGNIFICATION COPYING MACHINE

[75] Inventor: Masami Emoto, Kanagawa, Japan

[73] Assignee: Ricoh Company, Ltd., Japan

[21] Appl. No.: 332,872

[22] Filed: Dec. 21, 1981

[30] Foreign Application Priority Data

Dec. 22, 1980 [JP] Japan .................. 55-181648

[51] Int. Cl.³ .................................. G03B 27/52
[52] U.S. Cl. .............................. 355/55; 355/8; 355/11
[58] Field of Search ............... 355/50, 55, 8, 11, 56

[56] References Cited

U.S. PATENT DOCUMENTS 4,080,057  3/1978  Nakane et al. ................ 355/11
4,139,297  2/1979  Hayashi et al. ................ 355/11
4,172,658  10/1979  Tani et al. .................... 355/55

*Primary Examiner*—Monroe H. Hayes
*Attorney, Agent, or Firm*—Guy W. Shoup

[57] ABSTRACT

A photosensitive member is subject to a slitwise exposure. An imaging lens system is displaced in accordance with the magnitude of a magnification being utilized during a copying process which is switched. Disposed adjacent to the end face of a lens in the imaging lens system is at least one rectangular light shield member so that its lengthwise dimension corresponds to a slitwise scan direction. The light shield member is movable into or out of a light flux which is utilized for purpose of exposure, and is integral with the imaging lens system as the latter is displaced in accordance with a magnification being utilized during a particular copying process. During a light shielding operation, the light shield member is adapted to be disposed within or wedged partly into the light flux of exposure. As the copying magnification is switched, the amount of exposure light which is cut off by the light shield member changes, whereby the distribution of exposure light in the slit-shaped exposure station is made uniform as viewed lengthwise of the exposure station.

24 Claims, 13 Drawing Figures

FIG. 7 I    FIG. 7 II    FIG. 7 III
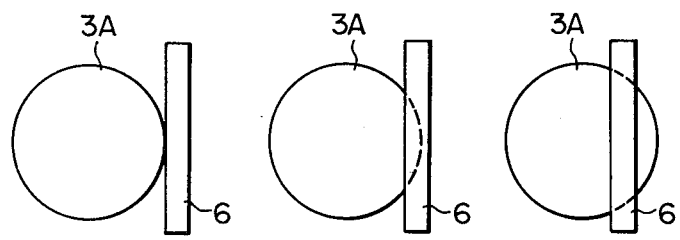
FIG. 8    FIG. 9
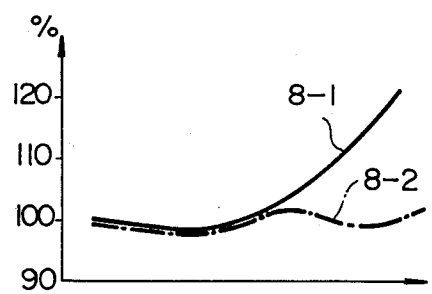 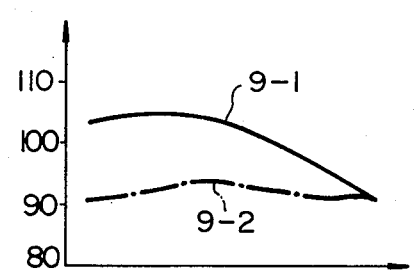
FIG. 10    FIG. 11
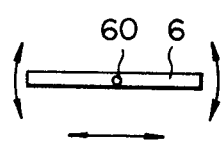 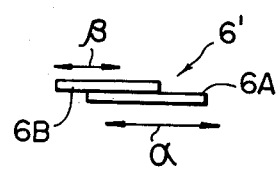

EXPOSURE PROCESS FOR USE IN A VARIABLE MAGNIFICATION COPYING MACHINE

BACKGROUND OF THE INVENTION

This invention relates to an exposure process for use in a variable magnification copying machine.

A copying technique is well known utilizing a drum-, belt- or sheet-shaped photosensitive member for electrophotography, which is subject to a slitwise exposure to form an electrostatic latent image thereon. Generally speaking, a slitwise exposure technique utilizes a slit-shaped illumination to scan an original so that an image of the illumination which is formed by an imaging lens system scans a photosensitive member for purpose of exposure, and thus is achieved by a relative movement between an original, an exposure optics and the photosensitive member. Conventional arrangements to achieve such a slitwise exposure may comprise a relative movement between a set including an original and a photosensitive member and an exposure optic system, or may comprise a pair of plane mirrors disposed on the object side of an imaging lens system for movement in order to scan an original slitwise, whereby an image of an original area being scanned may be focussed on a given location within the space of the copying machine which defines an exposure station, across which the surface of a photosensitive member is moved.

FIG. 1 illustrates an arrangement in which an original 0 placed on an original receptacle 1 is slitwise scanned by a lamp 2 in a direction indicated by an arrow, while simultaneously moving an imaging lens system 3 from a solid line position to a broken line position, thus focussing an image of an area of the original which is being illuminated onto an exposure station P, across which the surface of a photosensitive member 4 is moved. FIG. 2 illustrates another technique in which an imaging lens 3 is fixedly disposed while a pair of plane mirrors 6, 7, which are disposed on the image side of the imaging lens, are moved either integrally or separately as the original is slitwise scanned by an illumination from the lamp 2, thereby forming an image of an area of the original being illuminated onto an exposure station P, across which the surface of the photosensitive member 4 is moved. It is to be understood that for purpose of simplicity of description, similar parts are designated by like reference numerals in both FIGS. 1 and 2. In these figures, numeral 5 represents a plate adapted to cut off part of imaging light flux in order to define the slit width of the exposure station, but this will be referred to hereinafter as a slit plate in order to distinguish it from a light shield member to be described later.

It will be seen in FIGS. 1 and 2 that the original 0 is illuminated by the lamp 2, and the resulting light image is utilized for purpose of exposure. The configuration of the exposure station is defined to be a slit form by the slit plate 5. As viewed in FIGS. 1 and 2, the lengthwise direction of the slit-shaped exposure station P will be defined as a direction which is perpendicular to the plane of the drawing. It will be seen that the surface of the photosensitive member 4 moves in a direction which is perpendicular to the lengthwise direction of the exposure station P. However, considering the relationship between the surface of the photosensitive member 4 and the surface of the receptacle on which the original is placed, it will be seen that the surface of the photosensitive member moves in a plane parallel to the surface of the receptacle. The direction in which the surface of the photosensitive member moves at the exposure station P will be referred to hereinafter as a slitwise scan direction, which is the horizontal direction, as viewed in FIGS. 1 and 2. In FIGS. 1 and 2, the angle of incidence of exposure light flux which impinges upon the imaging lens system 3 continuously varies in the slitwise scan direction as the slitwise exposure proceeds. In the arrangement of FIG. 1, it will be seen that the imaging lens system moves in the slitwise scan direction or in a direction perpendicular to the optical axis thereof.

The illumination of the original 0 may take place by a slitwise scanning as mentioned above, or the entire surface may be concurrently illuminated.

It is a prerequisite to form a satisfactory electrostatic latent image on the photosensitive member that the surface of the photosensitive member be uniformly exposed throughout. For a slitwise exposure, this means that the distribution of exposure light be uniform lengthwise of the slit-shaped exposure station.

When the aperture efficiency and the biquadratic law of cosine in the imaging lens system are taken into consideration, it is necessary to achieve a uniform distribution of exposure light in the manner mentioned above that the distribution of the intensity of illuminating light incident on the original receptacle be such that the intensity is low at the middle and is high at the opposite ends, as viewed in the lengthwise direction of the exposure station or in a direction perpendicular to the plane of the drawing of FIGS. 1 and 2. At this end, the illumination of the original is performed in a manner to satisfy such requirement.

This presents no problem whatsoever where the copying machine uses a fixed magnification. However, in a variable magnification copying machine in which the imaging lens system is displaced in accordance with a particular magnitude of the magnification being utilized, a uniform distribution of exposure light over the lengthwise direction of the exposure station which may be achieved at a particular magnitude of copying magnification cannot be maintained when the magnification is changed.

It will be appropriate to mention the displacement of the imaging lens system here in some detail as the magnitude of the copying magnification is changed. It should be noted such displacement includes a center referenced displacement and a displacement from an offset reference. Specifically, referring to FIGS. 3 and 4, numeral 1-1 represents the surface of the original receptacle and numeral 4-1 the surface of the photosensitive member. As viewed in these figures, the horizontal or left-to-right direction corresponds to the lengthwise direction of the exposure station. Points A, B, C and D represent the ends of effective copying regions on the surfaces 1-1 and 4-1. When the imaging lens system 3 assumes the solid line position, the magnification is unity, and the points A and B correspond to points C and D, respectively. When the imaging lens system 3 assumes a phantom line position, the copying magnification is less than unity or the image is focussed on a reduced scale. For the displacement of FIG. 3, the points A and B correspond to points A' and B', respectively, on the surface of photosensitive member 4-1. However, a middle point q between the points A and B on the receptacle surface 1-1 corresponds to a middle point q' between the points C and D on the surface of photosensitive member 4-1. A displacement of a focussing lens system which yields such correspondence is referred to as a center referenced displacement. On the other hand, in the arrangement of FIG. 4 when using a reduced magnification, the points B corresponds to a point B', but a point A' which corresponds to the point A coincides with the point C which is produced when the magnification of unity is used. A displacement of the imaging lens system which yields such correspondence is referred to as an offset reference displacement. The same applies for a magnification greater than unity as that described above in connection with a magnification less than unity. It is to be understood in the description of FIGS. 3 and 4 that a change in the path length between the surfaces 1-1 and 4-1 which is generally required as the magnification is changed is neglected.

Returning to distribution of exposure light mentioned above, it is to be noted that for the arrangement of FIG. 3, if the distribution of the intensity of light illuminating the original is properly set for a magnification of unity, the distribution of exposure light as viewed in the lengthwise direction of the exposure station will be changed for a magnification less than unity such that the exposure light will be excessively high toward the points A' and B' as compared to the point q'. Similarly, for the arrangement of FIG. 4, the exposure light will be excessively high toward the point B' in a progressive manner. FIG. 5 illustrates a technique which compensates for the distribution of exposure light for a magnification less than unity in the arrangement of FIG. 4. Specifically, when a magnification less than unity is utilized, the slit plate 5 is displaced in a manner shown by sold line in FIG. 5 so that the width of the slit defined in the exposure station progressively narrows from the point C toward the point B'. In FIG. 5, the broken lines indicate the position of the slit plate assumed when the magnification of unity is used.

The described technique is effective to a degree for a slit width of the exposure station which is equal to or greater than 15 mm, but is hardly applicable to an arrangement utilizing a slit width on the order of 5 mm which is recently frequently employed in order to achieve an image of a high quality. Also where the intensity of exposure light is not uniform crosswise of the slit, as exemplified by a centrally topped distribution, the described compensation technique cannot achieve a uniform distribution of exposure light. Furthermore, it is practically infeasible to correct the distribution of the intensity of light illuminating the original each time the magnification is changed.

SUMMARY OF THE INVENTION

It is an object of the invention to provide an exposure process for use in a variable magnification copying machine which utilizes a slitwise exposure wherein a slitwise exposure with a proper distribution of exposure light is always maintained independently from a change in the magnitude of the copying magnification.

It is a feature of the invention that at least one rectangular light shield member is disposed adjacent the end face of a lens. The rectangular configuration of the light shield member means precisely that the light shield member intercepts and shape it into a rectangular form for exposure of the photosensitive member. Consequently, the term "rectangular configuration" refers to the configuration of the light shield member which is effective to perform the interception of light, and hence it is unnecessary that the light shield member be generally rectangular in configuration. The light shield member is disposed adjacent the end face of a lens, namely, adjacent the entrance or exit end face. The light shield member is integral with the imaging lens system as far as the displacement of the latter is concerned. Specifically, as the imaging lens system is moved in accordance with a change in the magnitude of the copying magnification, the light shield member is also displaced in integral manner with the imaging lens system. Since the exposure light flux is bunched together adjacent the lens end face of the imaging lens system, the size of the light shield member or the length of the rectangular configuration thereof may be on the same order as or slightly greater than the lens aperture.

The light shield member is oriented so that the lengthwise direction thereof or the length of the rectangular configuration is aligned with the slitwise scan direction. As a result of such arrangement, the exposure light flux can be intercepted in the slitwise scan direction so as to maintain a constant light intercepting rate if the exposure technique as illustrated in FIGS. 1 and 2 are used wherein the angle of incidence of light flux onto the imaging lens system continuously varies in the slitwise scan direction. During a light intercepting operation, the light shield member is located so as to be wedged partly into the exposure light flux as viewed lengthwise of the exposure station. As the copying magnification is changed, the rate of intercepting the exposure light flux by the light shield member is varied, thus achieving a uniform distribution of the exposure light as viewed lengthwise of the exposure station.

BRIEF DESCRIPTION OF THE DRAWINGS

FIGS. 7(I) to (III) are schematic illustrations of the operation of the invention.

FIGS. 8 and 9 graphically illustrate the effect of the invention.

FIG. 10 illustrates another aspect of the invention.

FIG. 11 is a schematic illustration of a further aspect of the invention.

DESCRIPTION OF EMBODIMENTS

Figure 1:
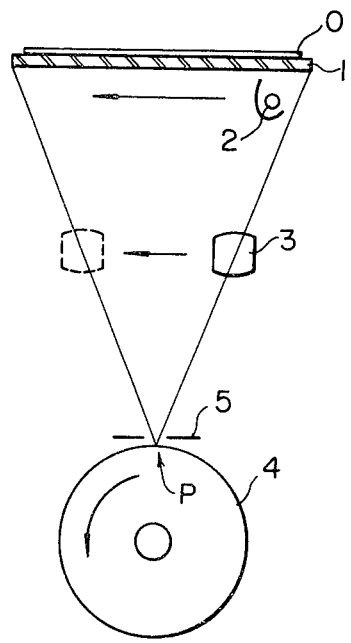
FIG. 1 is a schematic view illustrating an example of slitwise exposure.
Figure 2:
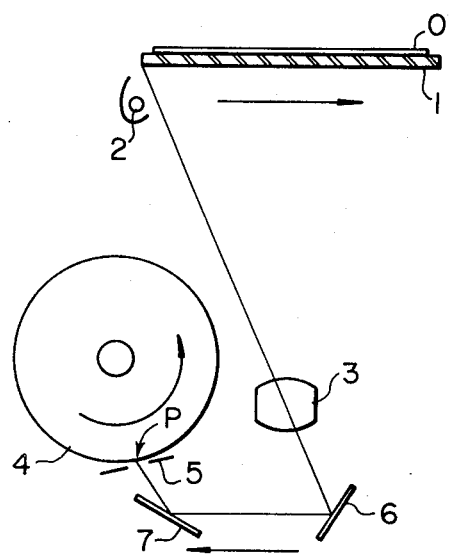
FIG. 2 is a schematic view illustrating another example of slitwise exposure.
Figure 3:
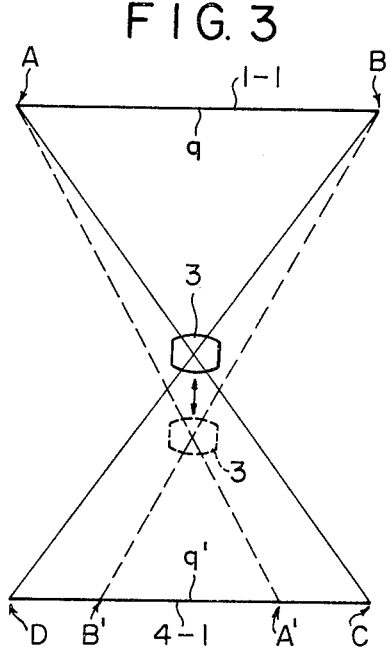
FIG. 3 is a diagrammatic view illustrating the displacement of an imaging lens system on a center referenced basis as the copying magnification is changed.
Figure 4:
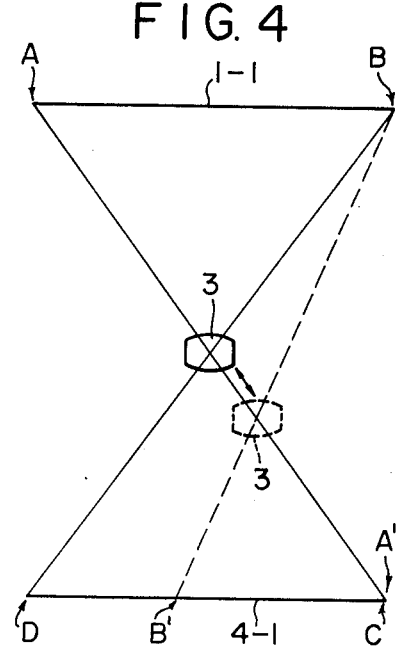
FIG. 4 is a diagrammatic view illustrating the displacement of an imaging lens system on an offset reference basis as the copying magnification is changed.
Figure 5:
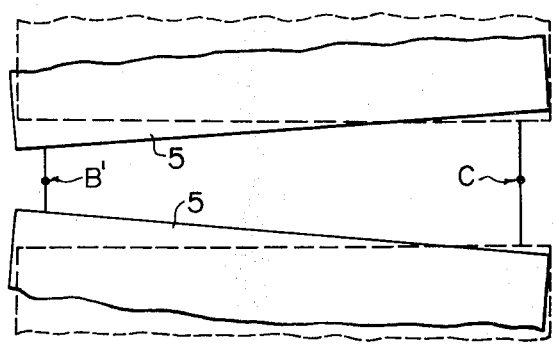
FIG. 5 is a schematic illustration of a conventional technique for adjusting the amount of exposure light.
Figure 6:
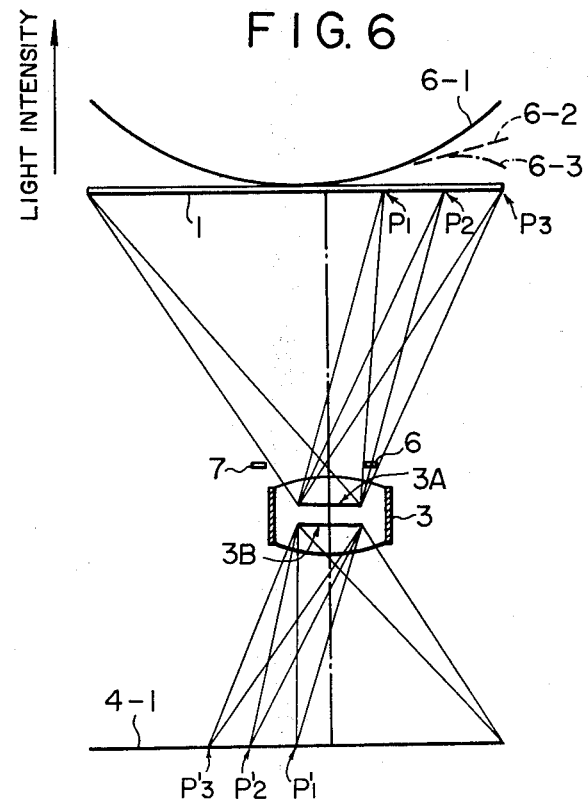
FIG. 6 is a schematic view illustrating an arrangement for carrying out the exposure process of the invention.

FIG. 6 illustrates the application of the invention to an exposure technique as illustrated in FIG. 1. Unless a confusion is likely, similar numerals are used in FIG. 6 as those used in FIGS. 1 and 4.

An imaging lens system 3 is shown as located for a reduced magnification $m=0.71$. Reference character 3A represents an entrance pupil and 3B an exit pupil. It is assumed that the distribution of the intensity of light illuminating the originals, as viewed in the lengthwise direction of the exposure station or in the horizontal direction as viewed in FIG. 6, is properly set to assure a proper exposure for a copying magnification $m=1$, such relative distribution being illustrated by a curve 6-1 in FIG. 6. For a reduced magnification m=0.71, the proper distribution of light intensity on the original surface must be such as is indicated by broken line curve 6-2. At this end, the exposure light flux is intercepted by a light shield member 6 so that the exposure light flux which impinges upon the imaging lens system 3 is substantially the same as the exposure light flux according to the intensity distribution 6-2. The light shield member 6 is rectangular configuration and its lengthwise direction is perpendicular to the plane of the drawing, or the slitwise scan direction, as viewed in FIG. 6. Considering now three points $P_1$, $P_2$ and $P_3$ on the original which are being illuminated, the entrance pupil 3A of the imaging lens system 3 will be intercepted in the manner shown in FIGS. 7 (I), (III) and (III), respectively, as viewed from the points $P_1$, $P_2$ and $P_3$, respectively. As a result of such intercepting effect, the distribution of exposure light as viewed lengthwise of the exposure station or the imaging surface 4-1 will be a proper one which would be achieved as if the surface of the original is illuminated according to the light intensity distribution 6-2. It is one of the features of the intercepting effect by the light shield member 6 that part of the light flux impinges upon the imaging lens system 3 on both sides of the light shield member 6 as illustrated in FIG. 7(III). Thus, referring to FIG. 6 in connection with FIG. 7(III), it will be seen that the exposure light flux from a region adjacent the point $P_3$ shown in FIG. 6 will impinge upon the imaging lens system 3 from the right-hand side as well as the left-hand side of the light shield member 6. Assuming that there is no component of light flux which impinges from the right-hand side of the light shield member 6, this corresponds to an imaginary distribution of illuminating light intensity which is represented by a phantom line curve 6-3 shown in FIG. 6. In other words, the light intercepting effect is excessively high, and a region adjacent the point $P'_3$ corresponding to the point $P_3$ will be under an underexposure. In this manner, the fact that part of the exposure light flux impinges upon the imaging lens system from both sides of the light shield member 6 is represented by the expression that the light shield member is wedged into the exposure light flux, as viewed in the lengthwise direction of the slit-shaped exposure station.

In FIG. 6, numeral 7 represents a light shield member which is utilized for a magnification greater than unity.

Ratio of illuminance in the lengthwise direction of the exposure station which is achieved as a result of the correction is illustrated graphically in FIGS. 8 and 9. Curve 8-1 shown in FIG. 8 shows a relative illuminance when no light shield member 6 is employed to provide a light intercepting effect. On the other hand, a phantom line curve 8-2 represents a relative illuminance which is obtained after the correction by the light shield member 6. Similarly, a curve 9-1 shown in FIG. 9 shows a relative illuminance for a magnification m=1.41 when no correction is made while a phantom line curve 9-2 shows a relative illuminance which is obtained after the correction by the light shield member 7. The light intercepting effect is evident in either instance, providing a more uniform distribution of the exposure light in the lengthwise direction of the exposure station as compared with that achieved when no correction is made.

Where only two values of copying magnification, for example, m=1 and m=0.71, are used, and the operation of the copying machine is switched between these values, it is only necessary that a single light shield member be provided. The configuration of the light shield member uniquely determines its position to be assumed during the light intercepting operation.

However, where three or more values of the magnification are to be utilized, it is necessary that separate light shield members be provided for magnifications less than and greater than unity and that for either magnification, both the width and the location of the light shield member generally varies with the copying magnification. By way of example, if a common light shield member 6 is used for m=0.71 and m=0.65, the width and the location of the light shield member varies in accordance with the magnitude of the magnification. In such instance, the light shield member 6 may be disposed to be oscillatable about a pin 60 as shown in FIG. 10, with its lengthwise direction oriented perpendicular to the plane of the drawing. By oscillating the member 6, its intercepting width can be changed or the member 6 may be displaced in the horizontal direction, as viewed in FIG. 6, to adjust its location. Alternatively, a light shield member 6' comprising a pair of plates 6A, 6B may be used as shown in FIG. 11 so that the entire light shield member 6' may be displaced in a direction indicated by an arrow $\alpha$ to adjust the location while sliding the plate 6B with respect to the plate 6A in a direction indicated by an arrow $\beta$ to change the width thereof.

While the invention has been described above on the basis of a center reference, it should be understood that the invention is equally applicable to the offset reference basis.

What is claimed is:

1. An exposure process for use in a variable magnification copying machine in which a photosensitive member is subject to a slitwise exposure progressively in accordance with a scan direction normal to a lengthwise direction of an exposure slit, and an imaging lens system having an optical axis therefor being movable in the scan direction in conjunction with said progressive slitwise exposure and being displaceable in accordance with a particular magnitude of copying magnification which is utilized during a copying operation, the exposure process comprising the steps of providing at least one rectangular light shield member adjacent to the end face of a lens and oriented so that its lengthwise direction corresponds to said scan direction, the light shield member being integral with the imaging lens system as the latter is displaced, the light shield member being disposed so that it is wedged partly into an exposure light flux as viewed in the lengthwise direction of the exposure slit when the light shield member is to intercept light, and changing the extent of intercepting the exposure light flux by the light shield member as a copying magnification is changed, whereby the distribution of exposure light in the lengthwise direction of the exposure slit is made uniform.

2. An exposure process according to claim 1 in which the light shield member is disposed on the object side of the imaging lens system.

3. An exposure process according to claim 1 in which the light shield member is disposed on the image side of the imaging lens system.

4. An exposure process according to claim 1 in which the displacement of the imaging lens system occurs with respect to an offset reference.

5. An exposure process according to claim 4 in which the copying magnification can be changed between unity and a single reduced magnification less than unity, whereby a single light shield member is provided.

6. An exposure process according to claim 4 in which the copying magnification can be changed between unity and a single enlarging magnification greater than unity, whereby a single light shield member is provided.

7. An exposure process according to claim 4 in which the copying magnification can be changed between unity, a single magnification less than unity and a single magnification greater than unity, whereby two light shield members are provided.

8. An exposure process according to claim 1 in which the displacement of the imaging lens system is referenced to a center and wherein a pair of light shield members are symmetrically provided with respect to the optical axis of the imaging lens system.

9. An exposure process according to claim 1 in which the light shield member is oscillatable about a pin which extends parallel to the lengthwise direction thereof, whereby the light intercepting width of the light shield member can be changed in accordance with the magnitude of the copying magnification.

10. An exposure process according to claim 1 in which the light shield member comprises a pair of plates which are slidable relative to each other, thereby allowing the light intercepting width to be changed in accordance with the magnitude of the copying magnification.

11. An exposure process according to claim 1 in which the slitwise exposure of the photosensitive member takes place by a movement of the imaging lens system in a direction perpendicular to the optical axis thereof.

12. An exposure process according to claim 1 in which the slitwise exposure of the photosensitive member takes place by a movement of a pair of plane mirrors, disposed on the imaging side of the imaging lens system.

13. An exposure apparatus for use in a variable magnification copying machine in which a photosensitive member is subject to a slitwise exposure progressively in accordance with a scan direction normal to a lengthwise direction of an exposure slit, and an imaging lens system having an optical axis therefor being movable in the scan direction in conjunction with said progressive slitwise exposure and being displaceable in accordance with a particular magnitude of copying magnification which is utilized during a copying operation, the exposure apparatus comprising at least one rectangular light shield member adjacent to the end face of a lens and oriented so that its lengthwise direction corresponds to said scan direction, the light shield member being integral with the imaging lens system as the latter is displaced, the light shield member being disposed so that it is wedged partly into an exposure light flux as viewed in the lengthwise direction of the exposure slit when the light shield member is to intercept light and so that it changes the extent of intercepting the exposure light flux by the light shield member as a copying magnification is changed, whereby the distribution of exposure light in the lengthwise direction of the exposure slit is made uniform.

14. An exposure apparatus according to claim 13 in which the light shield member is disposed on the object side of the imaging lens system.

15. An exposure apparatus according to claim 13 in which the light shield member is disposed on the image side of the imaging lens system.

16. An exposure apparatus according to any one of claims 13 to 15, including means for displacing the imaging lens system with respect to an offset reference.

17. An exposure apparatus according to claim 16 in which the copying magnification can be changed between unity and a single reduced magnification less than unity, whereby a single light shield member is provided.

18. An exposure apparatus according to claim 16 in which the copying magnification can be changed between unity and a single enlarging magnification greater than unity, whereby a single light shield member is provided.

19. An exposure apparatus according to claim 16 in which the copying magnification can be changed between unity, a single magnification less than unity and a single magnification greater than unity, whereby two light shield members are provided.

20. An exposure apparatus according to claim 13 in which the displacement of the imaging lens system is referenced to a center and wherein a pair of light shield members are symmetrically provided with respect to the optical axis of the imaging lens system.

21. An exposure apparatus according to claim 13 in which the light shield member is oscillatable about a pin which extends parallel to the lengthwise direction thereof, whereby the light intercepting width of the light shield member can be changed in accordance with the magnitude of the copying magnification.

22. An exposure apparatus according to claim 16 in which the light shield member comprises a pair of plates which are slidable relative to each other, thereby allowing the light intercepting width to be changed in accordance with the magnitude of the copying magnification.

23. An exposure apparatus according to claim 16, including means for moving the imaging lens system in a direction perpendicular to the optical axis thereof to achieve the slitwise exposure of the photosensitive member.

24. An exposure apparatus according to claim 16, including a pair of moving plane mirrors, disposed on the imaging side of the imaging lens system, to achieve the slitwise exposure of the photosensitive member.

* * * * *